United States Patent
Burns

(10) Patent No.: US 6,424,148 B1
(45) Date of Patent: Jul. 23, 2002

(54) APPARATUS AND METHOD FOR SENSING AND MAGNETICALLY COMMUNICATING PHYSICAL PARAMETERS OF ROTATING SHAFT

(75) Inventor: Dennis A. Burns, White Bear Township, MN (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/702,076

(22) Filed: Oct. 30, 2000

(51) Int. Cl.[7] ................................................. G01B 7/30
(52) U.S. Cl. ................................. 324/207.25; 318/653
(58) Field of Search ......................... 324/254, 207.13, 324/207.25, 207.17, 207.16, 207.15; 318/253, 254, 652, 653; 310/68 B

(56) References Cited

U.S. PATENT DOCUMENTS 4,264,854 A 4/1981 Hawtree
4,831,510 A 5/1989 Dummermuth et al.
5,347,277 A * 9/1994 Nondahl ..................... 341/116
6,304,014 B1 * 10/2001 England et al. ........... 310/60 B

FOREIGN PATENT DOCUMENTS

JP 60-73316 9/1983

* cited by examiner

*Primary Examiner*—Edward Lefkowitz
*Assistant Examiner*—Subhash Zaveri

(57) ABSTRACT

A system and method for connectionless sensing of the physical parameters of a shaft that is capable of continuous rotation. The system involving placing a circuit assembly on the rotating shaft, powering the circuit assembly through energy transferred from a stator coil across a gap to a rotor coil, sensing physical parameter data on the shaft and communicating this data across the gap from the rotor coil to a stator coil.

12 Claims, 4 Drawing Sheets

APPARATUS AND METHOD FOR SENSING AND MAGNETICALLY COMMUNICATING PHYSICAL PARAMETERS OF ROTATING SHAFT

BACKGROUND OF THE INVENTION

A. Field of the Invention

This invention relates to rotating shaft multi-sensing. More specifically, the invention relates to an improved apparatus and method for measuring the physical parameters of a rotating shaft and communicating those parameters and other information to a stationary device.

B. Problems in the Art

Rotating shafts have numerous applications including drive shafts, as hydrostatic pump inputs and as motor outputs. In systems using rotating shafts, there is a rotor section and a stator section. The rotor section rotates and the stator section provides a stationary frame of reference with respect to the rotor section.

In such a system, it is desirable to measure the physical parameters of the rotating shaft for monitoring and other purposes. Such physical parameters include, but are not limited to rotational position, speed, velocity, acceleration, torque or side-loading, temperature, and vibration. These physical parameters can be measured with various sensors or calculated from other measurements.

There is a problem, however, in obtaining these physical parameters when the shaft is rotating, and in particular, when the shaft is rotating a continuous and full 360 degrees. The problem is communicating these parameters from the rotating shaft to the stator section.

A number of methods have been used in attempts to measure physical parameters of a rotating shaft. One such method is the use of a resolver. Resolvers have been used to sense angular position. Resolvers, however, require an oscillator and demodulator circuit with access to both the stator and rotor windings. This access meaning a wired connection. Thus, there are inherent difficulties with providing this wired access. Full 360 degree or continuous rotation could be provided for a resolver through use of a slip ring, also known as a rotary electrical joint. A resolver and slip ring combination however, adds cost and reduces reliability of the system.

Another class of device that has been used for angular position or speed sensing involves magnetometry related approaches. These approaches include Hall effect, magneto-restrictive, giant magneto-restrictive and similar approaches. One deficiency in these types of sensors is that they do not cover a continuous range of rotation. Furthermore, a magnetic field is required. Thus, a magnet or ring is required.

Optical sensors provide another approach. For example, optical encoders can be used to sense relative or absolute position. The use of optical sensors, however, is difficult and limited in demanding environments where dirt or dust negatively affect sensor performance.

A further problem in the prior art is that in order to obtain different types of sensing data different approaches may need to be combined.

It is therefore an objective of the present invention to provide an apparatus and method of measuring physical parameters of a rotating shaft and making those parameters available to a stationary device.

It is a further objective of the present invention to provide an apparatus and method of measuring physical parameters of a rotating shaft and making those parameters available to a stationary device while still permitting continuous rotation of the shaft.

It is a still further objective of the present invention to provide a contactless connection between the stator and rotor over which both power and data may be transferred.

Another objective of the present invention is to permit full operation even when the shaft is not rotating.

Yet another objective of the present invention is to provide a device that does not add significant weight or moment of inertia to the shaft.

Another objective of the present invention is to implement the device in a manner suitable for high volume production including high reliability and low cost.

These and other objectives will become apparent from the following description.

SUMMARY OF THE INVENTION

The following invention describes a method and means for sensing physical parameters of a shaft that is capable of continuous rotation and communicating those physical parameters to a stationary frame of reference. The invention provides for a number of different types of data to be sensed including rotational speed, rotational position, acceleration, torque, temperature, or vibration. Optionally, information can be digitally processed on the rotor. The invention also provides a contactless means of providing power to the rotor circuitry.

DETAILED DESCRIPTION OF AN EXEMPLARY EMBODIMENT

Figure 1:
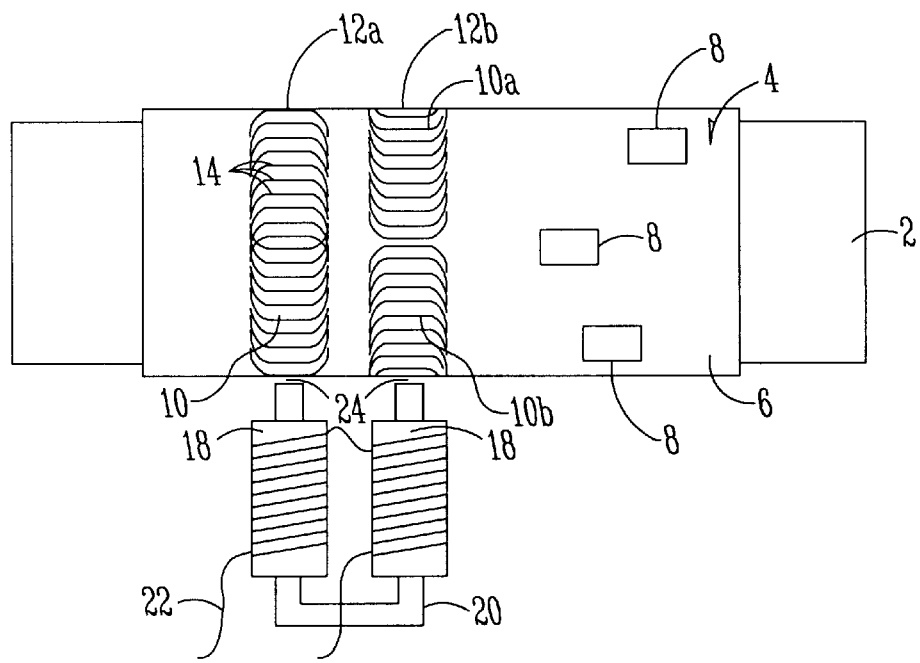
FIG. 1 is a diagrammatic view of the stator and rotor assembly.
Figure 2:
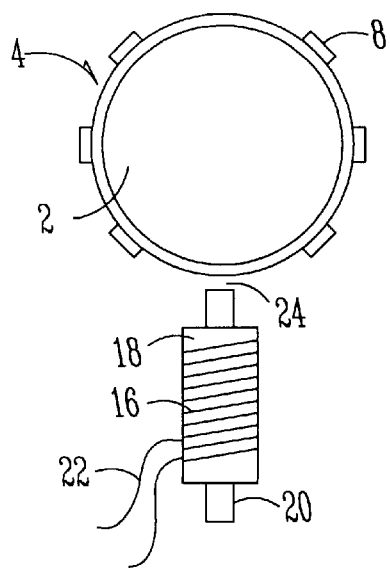
FIG. 2 is a diagrammatic representation of the shaft in relationship to a stator coil.

FIG. 1 is a diagrammatic representation that shows an overview of the rotor coils, stator coils and circuit assembly. A shaft 2 is shown. Attached to the shaft 2 is the circuit assembly 4. The circuit assembly 4 includes a substrate 6, electrical components 8 on the substrate and rotor coils 10 integral to the substrate. The electrical components 8 may require encapsulation or additional support if the radius of shaft 2 and the speed of rotation is such that centrifugal forces so require.

The rotor coils 10 are formed by conductive traces on the substrate 6. The substrate may be a flexible circuit or may be a series of dielectric and conductive layers chemically deposited and stacked as is well known within the art. In the present embodiment, two conductive layers of copper are used for rotor coil layout. It is to be appreciated that other types of conductors may also be used. It is to be understood that more than two layers may be used to form the rotor coils. Use of additional layers would allow a reduction in the coil width.

In FIG. 1 two rotor coil rings 12 are shown. Each rotor coil ring 12 having two rotor coils 10. Within each ring 12 the coils 10a and 10b are aligned end to end. Each coil 10 spans 180 degrees of the shaft. There is a 90 degree offset between the position of the coils on ring 12a and 12b.

Figure 3:
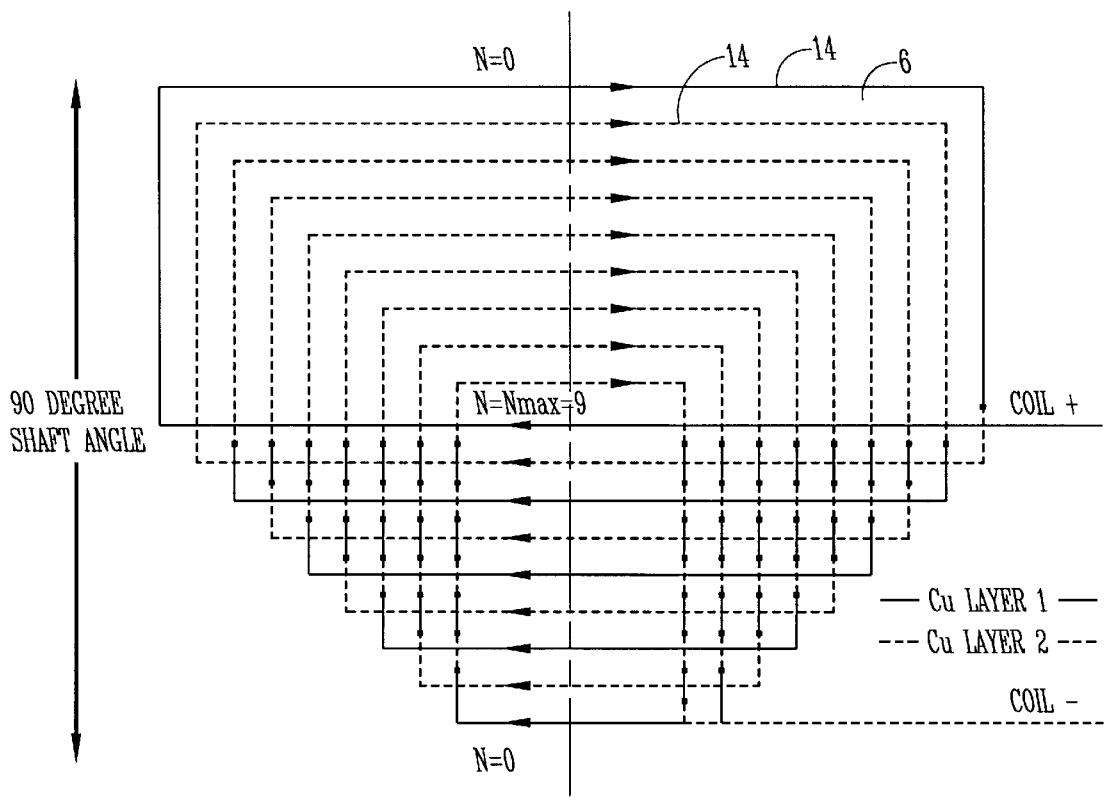
FIG. 3 is a diagram of a rotor coil layout on a substrate that is two layers.

As shown best in FIG. 3, in the context of a nine turn coil, each coil has a number of turns 14. It is to be appreciated that many more than nine turns 14 could be used. FIG. 3 shows how the turns 14 are placed on the conductive layers of a two-layer substrate to form the coil. Additional turns and additional conductive layers could be used as is known in the art.

Returning to FIG. 1, the stator coil assembly 16 has two coil assemblies 18 on the stator core 20. The coils are connected series-aiding with connection wires 22. There is a gap 24 between the rotor assembly and the stator coil assembly 16. The stator core 20, the magnetically permeable shaft 2, and the two gaps 24 form a magnetic circuit.

The present invention contemplates that shaft 2 may not always be magnetically permeable. When shaft 2 is not magnetically permeable, a magnetically permeable collar may be placed between the rotor circuit substrate 6 and the shaft 2 to complete the magnetic circuit. It is to be understood that where the shaft is used in the context of a magnetic circuit either the shaft is magnetically permeable, or else a magnetically permeable collar is used.

Within the magnetic circuit, flux passes out of one pole of the stator core 20 and then passes through the adjacent gap 24 to the rotor. By centering the stator core poles 20 on the rotor coil rings 12, any magnetic flux entering one ring 12 will return through the other ring 12 and then through the adjacent gap 24 to the corresponding pole of the stator core 20.

The rotor coil rings are offset by 90 degrees. Because of this 90 degree offset between the rotor coil rings, flux will be enclosed by at least half of the turns of one coil. As the shaft is rotating, the amount of magnetic coupling in one rotor coil ring 12 is increasing as the magnetic coupling in the other rotor coil ring 12 is decreasing. The voltage across these coils relates to certain physical parameters of the shaft as will be discussed in detail.

Figure 4:
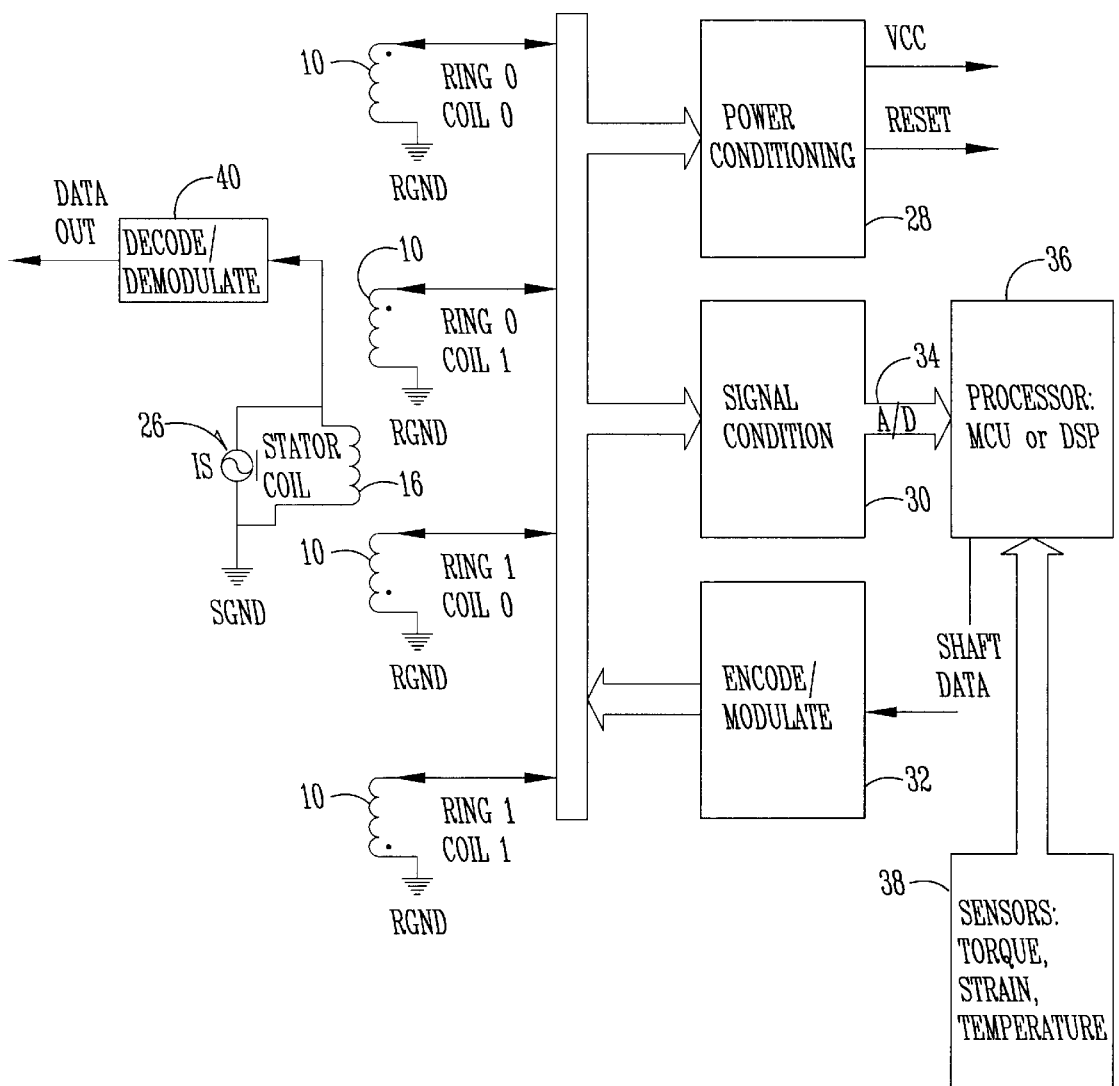
FIG. 4 is a block diagram of the electronics processing.

FIG. 4 shows a block diagram of the electronics processing in one embodiment of the present invention. In FIG. 4, there are two rotor coils 10 per rotor coil ring for a total of 4 rotor coils. Stator coil assembly 16 is in magnetic contact with the rotator coils 10. Stator coil 16 is driven by an alternating current source 26. The stator coil 16 and rotor coils 10 form a transformer. Excitation may be applied on either side of the transformer to transform power or information to the other side. There is therefore a power conditioning circuit 28, a signal conditioning circuit 30 receiving information from rotor coils 10 and a encoder or modulating circuit 32 to transfer information to the rotor coils 10 and then to the other side of the transformer located at the stator coils 16. This information is then decoded or demodulated accordingly at the decoder/demodulator 40 so that the data can be recovered from the signal.

It is to be understood that analog means as well as digital means can be used to process the information and prepare it for communication across gap 24. In FIG. 4's digital embodiment, a signal carrying information passes through signal conditioning circuit 30, and is converted from an analog signal to a digital signal at the analog to digital converter 34. This information then is received by a processor 36. It is to be understood that the processor could be a microcontroller or a digital signal processor or their equivalents. It is to be further understood that analog to digital converter 34 may be a part of processor 36. Processor 36 is also capable of receiving information from other sensors including sensors that would be used to sense torque, strain, temperature, or other physical parameters of the rotating shaft. The present invention contemplates the use of sensors for making measurements. These sensors include, without limitation, strain gauges, temperature sensors, pressure sensors, and vibration sensors. The processor 36 then transfers this data to be encoded or modulated at 32. In an alternative embodiment, an analog processing could occur as opposed to digital processing.

It is to be further understood that the encoder or modulator can use numerous methods to encode the information onto a signal. For example, when done digitally, a serial bit stream could be used or the information could be encoded in the width of a pulse or other means as are known in the art. When an analog processing unit is used, analog techniques such as amplitude modulation, frequency modulation, or frequency shift keying may be used as well as others that are well known in the art. The data may be transmitted at a rate that is several times or more higher than the excitation frequency. This allows the processor to synchronize the transmission during a high impedance condition which minimizes signal distortion. It also permits a simpler means to extract the data at the stator. This could be done with a high pass filter prior to decoding or demodulating.

Figure 5:
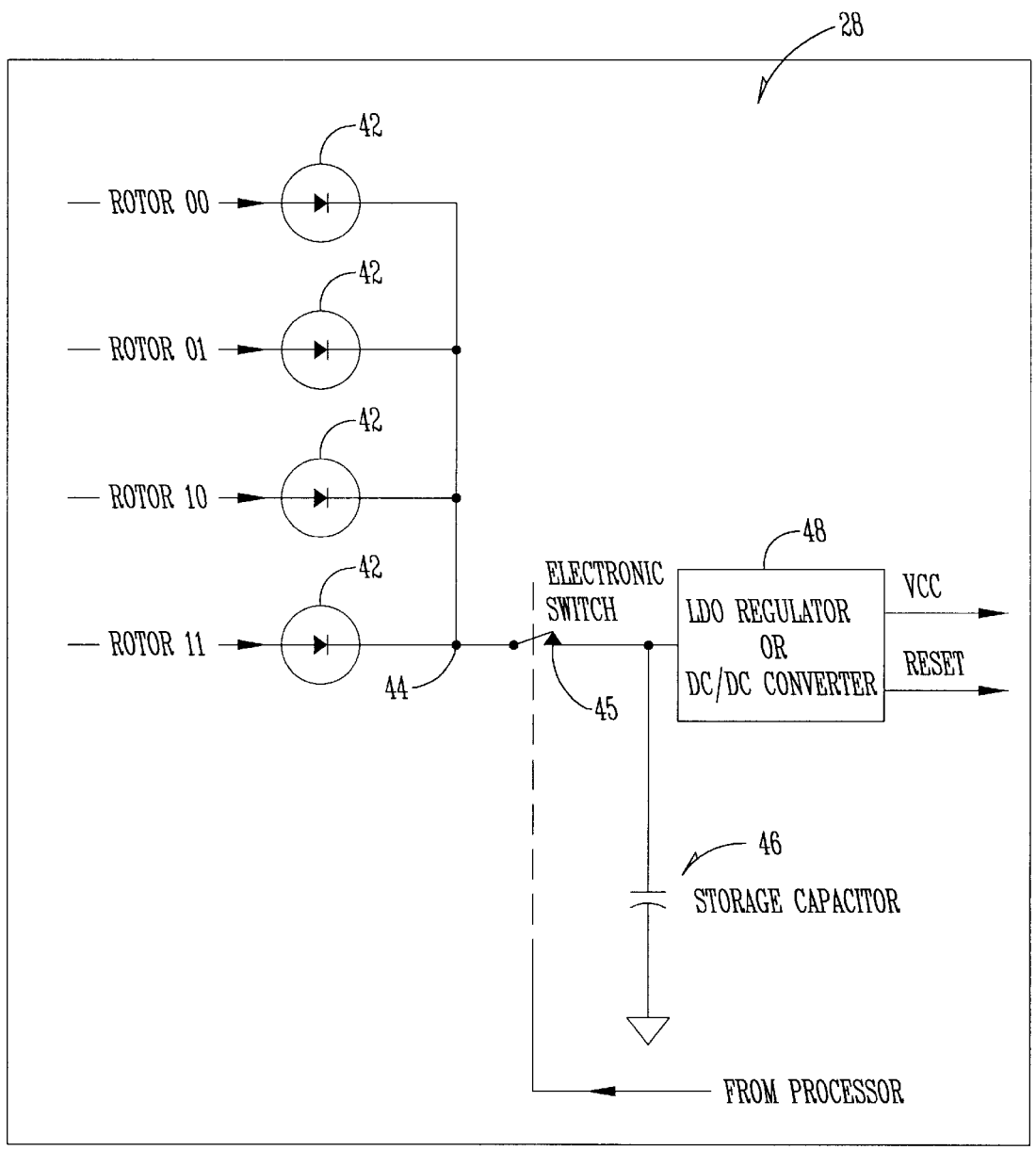
FIG. 5 is a block diagram of the rotor power conditioning circuit.

One embodiment of a power conditioning circuit 28 is shown in greater detail in FIG. 5. Each rotor coil 10 is electrically connected to a rectifier diode 42 at its anode. Each rectifier diode 42 connects at its cathode to a node 44. A storage capacitor 46 also connects to node 44. The capacitor stores energy for delivery during the rotor coil negative cycles. A regulator 48 is also connected to node 44. The regulator 48 may be a low dropout linear regulator, a high efficiency charge pump converter, or other regulator that provides a regulated voltage and optionally a reset signal to the rotor electronics.

The physical parameter of shaft position or shaft angle can be measured with the embodiment of the invention shown best in FIGS. 1 and 4. It is to be understood that different numbers of coils and configurations of coils will result in different calculations being required to calculate shaft position. The present invention contemplates that different numbers and configurations of coils can be used, and the calculations of shaft angle for this embodiment are given only by way of example.

In one embodiment of the present invention, shaft angle can be determined and this information can be transferred from the rotor section to the stator section. The shaft angle can be determined by analyzing the rotor coil voltages under a known load condition. In this example negative peak voltages are read which corresponds to a fully unloaded condition. It is to be understood that some shifting of the negative peaks may be caused by rotor voltage distortion. This distortion can be minimized by power efficient design or by direct compensation.

Optionally, an electronic switch 45 may be used to disconnect all coils from the storage capacitor 46 and regulator 48 during signal conversions. This will minimize or eliminate errors caused by power circuit loading.

In determining shaft position, a determination is made as to which two adjacent rotor coils are active. The two adjacent rotor coils with the highest sum of absolute voltages indicate the active zone. In this example, this zone is a 90-degree zone. The present invention contemplates that different numbers and configurations of coils result in different sizes of zones. To resolve the shaft position further, dividing either coil voltage by the zone total and multiplying by 90 degrees yields the relative position of the shaft within the zone.

This approach to shaft angle measurement eliminates error due to flux amplitude effects and flux rate of change.

The use of a measure of the total coupled flux rate of change cancels out these effects.

A source of error is introduced due to the rotation of the rotor coils in the stator field. The error voltage is proportional to the angular rate and the instantaneous excitation flux level. The error, as a percentage of the non-rotating static position, may be minimized by increasing the excitation rate of change, without increasing the excitation flux amplitude. Thus, maximizing the excitation frequency can minimize this error.

Another source of error that can be introduced occurs when there is a time delay between the reading of the rotor voltages, as there would be an accompanying change in phase. Accordingly, this time delay should be minimized or otherwise compensated for.

It is to be understood that because shaft position can be measured, additional physical parameters can be calculated from shaft position or successive shaft position measurements. These physical parameters include speed and acceleration. The present invention also contemplates that additional sensors could be used for other measurements.

Thus, an apparatus and method for rotary shaft multi-sensing has been disclosed which solve problems and deficiencies in the art. It will be readily apparent to those skilled in the art that multiple sensors can be used to measure physical parameters of the rotating shaft. From the foregoing, it will be observed that numerous variations and modifications may be affected without departing from the spirit and scope of the novel concepts of the present invention. It is understood that no limitation with respect to the specific embodiment illustrated herein is intended or should be inferred. The terms and expressions which have been employed herein are used as terms of description and not of limitation. There is no intent in the use of such terms and expressions to exclude any future equivalents of features shown and described herein, but it is recognized that various modifications are possible within the scope of invention now claimed.

What is claimed is:

1. A system for sensing physical parameters of a shaft capable of continuous rotation, said system comprising:
    a circuit assembly physically attached to said shaft, said circuit assembly containing a plurality of rotor coils and a modulator;
    a stator coil;
    a magnetic path between one or more of said rotor coils and said stator coil;
    said modulator adapted to prepare data for communication over the magnetic path;
    a demodulator capable of recovering the data, said demodulator electrically connected to said stator coil.

2. The system of claim 1 further comprising a sensor capable of producing data positioned on the circuit assembly.

3. The system of claim 1 wherein the data includes rotational position, speed, acceleration, torque, temperature, or vibration.

4. The system of claim 1 wherein the circuit assembly includes a power conditioning circuit to receive power, said power conditioning circuit electrically connected to said rotor coils and receiving energy through said rotor coils.

5. The system of claim 1 wherein the circuit assembly includes a signal conditioning circuit to receive signals, said signal conditioning circuit electrically connected to said rotor coils.

6. The system of claim 5 further comprising an analog to digital converter and a processor attached to the circuit assembly wherein the signal conditioning circuit is electrically connected to the analog to digital converter and the analog to digital converter is electrically connected to the processor.

7. A rotor assembly for sensing physical parameters of a shaft capable of continuous rotation, said assembly comprising:
    a circuit assembly physically attached to said shaft, said circuit assembly containing a plurality of rotor coils, a modulator electrically connected to said coils, a power conditioning circuit electrically connected to said coils, a signal conditioning circuit electrically connected to said coils, and a processing circuit, said processing circuit receiving an electric signal from said signal conditioning circuit and sending a second electric signal to said modulator.

8. The rotor of claim 7 wherein the processing circuit includes an analog-to-digital converter and a processor; said analog-to-digital converter electrically connected to said processor.

9. The rotor of claim 7 wherein the rotor coils are grouped in rings.

10. The rotor of claim 7 further comprising a sensor, said sensor electrically connected to the processing circuit.

11. A method for sensing physical parameters of a continuous rotation capable shaft comprising:
    establishing a magnetic path between a stator coil and a plurality of rotor coils;
    sensing physical parameters of the shaft;
    modulating or encoding said parameters;
    back driving the rotor coils with the parameters to communicate across the magnetic path;
    receiving a signal containing the parameters at the stator coil;
    extracting the parameters from the signal.

12. The method of claim 11 wherein the step of sensing further comprises:
    measuring the voltage across each rotor coil;
    summing each set of adjacent rotor coil absolute voltages;
    selecting the set of adjacent rotor coil voltages corresponding to the highest sum to determine an active zone;
    dividing a coil voltage by the zone total and multiplying by the size of the zone to find the position of the shaft.

* * * * *